(12) United States Patent
Djeu

(10) Patent No.: US 7,789,556 B2
(45) Date of Patent: Sep. 7, 2010

(54) THERMALLY COMPENSATED DUAL-PROBE FLUORESCENCE DECAY RATE TEMPERATURE SENSOR AND METHOD OF USE

(75) Inventor: Nicholas Djeu, Tampa, FL (US)

(73) Assignee: University of South Florida, Tampa, FL (US)

( * ) Notice: Subject to any disclaimer, the term of this patent is extended or adjusted under 35 U.S.C. 154(b) by 344 days.

(21) Appl. No.: 11/939,974

(22) Filed: Nov. 14, 2007

(65) Prior Publication Data

US 2008/0117951 A1  May 22, 2008

Related U.S. Application Data

(60) Provisional application No. 60/866,143, filed on Nov. 16, 2006.

(51) Int. Cl.
*G01K 11/00* (2006.01)
*G01J 5/08* (2006.01)

(52) U.S. Cl. .................. 374/161; 374/130; 374/137; 374/112; 356/43

(58) Field of Classification Search .......... 374/100, 374/112, 111, 115, 120, 130, 131, 132, 133, 374/137, 141, 159–162; 356/43
See application file for complete search history.

(56) References Cited

U.S. PATENT DOCUMENTS

| 3,327,584 A * | 6/1967 | Kissinger ............... 356/614 |
| 4,367,040 A * | 1/1983 | Goto ..................... 356/44 |
| 4,429,829 A | 2/1984 | Dutton |
| 4,749,254 A * | 6/1988 | Seaver ................. 385/12 |
| 4,974,929 A * | 12/1990 | Curry .................. 385/12 |
| 5,035,508 A * | 7/1991 | Carter et al. ............ 356/416 |
| 5,210,590 A * | 5/1993 | Landa et al. ............ 356/319 |
| 5,615,953 A * | 4/1997 | Moskal ................ 374/7 |
| 5,696,863 A | 12/1997 | Kleinerman |
| 5,886,783 A * | 3/1999 | Shapanus et al. ......... 356/300 |
| 6,045,259 A * | 4/2000 | Djeu .................... 374/161 |
| 6,053,632 A * | 4/2000 | Leininger .............. 374/130 |
| 6,138,046 A * | 10/2000 | Dalton ................. 600/476 |
| 6,183,130 B1 | 2/2001 | Adams et al. |
| 6,283,632 B1 | 9/2001 | Takaki |
| 6,744,503 B2 * | 6/2004 | Vo-Dinh et al. ........... 356/318 |
| 7,104,683 B2 | 9/2006 | Djeu |
| 7,164,812 B2 * | 1/2007 | Depeursinge et al. ...... 385/12 |
| 7,340,118 B2 * | 3/2008 | Wlodarczyk et al. ...... 385/12 |
| 7,428,054 B2 * | 9/2008 | Yu et al. ............... 356/480 |
| 2004/0141543 A1 * | 7/2004 | Jensen et al. ............ 374/142 |
| 2005/0020892 A1 * | 1/2005 | Acosta et al. ........... 600/316 |

\* cited by examiner

*Primary Examiner*—Gail Verbitsky
(74) *Attorney, Agent, or Firm*—Molly L. Sauter; Smith & Hopen, P.A.

(57) ABSTRACT

The present invention provides a dual-probe thermally compensated fluorescence decay rate temperature sensor capable of measuring the true temperature of a sample surface and its associated method of use.

10 Claims, 4 Drawing Sheets

THERMALLY COMPENSATED DUAL-PROBE FLUORESCENCE DECAY RATE TEMPERATURE SENSOR AND METHOD OF USE

CROSS REFERENCE TO RELATED APPLICATIONS

This application claims priority to currently pending U.S. Provisional Patent Application 60/866,143 filed Nov. 16, 2006, the contents of which are herein incorporated by reference.

BACKGROUND OF THE INVENTION

Determining the temperature of a solid object is typically accomplished by measuring the temperature of its surface. While it is preferable, for reliability of the measurement, to position a temperature sensor within the object itself so that the sensor is immersed in the material to be measured, this is often not a practical solution.

Contact thermometers, such as thermocouples, thermistors and RTDs (resistance temperature detectors), are often employed to measure the temperature of a surface. Achieving adequate thermal contact between the contact thermometer and the sample surface to be measured can be very difficult. Contact-type temperature sensors suffer from the universal drawback that the very act of contact with the sample drains heat from, or adds heat to, the sample, due to the thermal mass of the sensor relative to the object. Furthermore, in the case of contact with a solid surface, as opposed to immersion in a fluid, true contact is achievable only at a few points and hence the sensor never reaches the exact temperature of the sample surface being measured. As a result, the temperature read by the contact thermometer can deviate substantially from that of the sample.

The problems with contact thermometers are exemplified under low ambient pressure conditions, where conduction by gas in the gap between the sample surface and the thermometer is diminished until it becomes zero in a vacuum. Under these conditions, thermal contact is worsened due to the lack of air molecules present to help conduct heat from the surface to the sensor. Strong radio frequency or microwave fields are also known to negatively affect the ability of these contact thermometers to accurately measure surface temperatures. As such, all contact thermometers which are not incorporated into the surface itself suffer either because good thermal contact is extremely difficult to achieve or because they drain excessive heat from the surface to be measured.

One solution to the contact-type of temperature thermometer is to utilize a thermometer that does not require physical contact with the surface to be measured. One such thermometer known in the art utilizes infrared radiometry. With this approach, thermally-generated infrared radiation from the surface is collected and focused onto an infrared detector. While this is the most common non-contact thermometry technique used in the current state of the art, it is highly unreliable unless the emissive properties of the surface are exceedingly well characterized. Other problems include the need for line of sight access to the surface, poor sensitivity at moderate to low temperatures and the inability to measure transparent materials utilizing infrared radiation.

Accordingly, reliable measurements of surface temperatures have proven to be difficult. Measurement techniques currently known in the art having the highest levels of reliability are typically tedious and time consuming to perform.

Over the past two decades, the fluorescence-decay rate (FDR) type fiber optic temperature sensor has emerged as an increasingly important class of thermometric devices. The response of these sensors derives from the temperature dependent decay time of some optically induced fluorescence produced by a phosphor which is either attached to one end of the optical fiber or coated on the surface of the object being monitored. FDR sensors are generally recognized as the most accurate optically based systems for temperature measurement in the art. As a result, in spite of their relatively high cost, they are in routine use now in industries as diverse as semiconductor manufacturing, power generation, and metal forming when electromagnetic interference from the environment prevents the use of electrically based sensors or when moving materials are to be interrogated.

U.S. Pat. No. 7,104,683, issued on Sep. 12, 2006, incorporated herein by reference, describes a thermally compensated fluorescence decay rate temperature sensor. It requires for its operation at least four temperature measurements, made at two positions, with the phosphor tip at two different heating laser power levels. One pair of measurements should be made with the probe in contact or near contact (less than 1 mm) with the surface, and the second pair slightly further away (less than 3 mm). This in practice may cause some difficulty in certain situations.

Accordingly, what is needed in the art is a surface temperature measurement technique which is both fast and convenient, while at the same time, being reasonably accurate, reliable and adaptable to many environments.

SUMMARY OF INVENTION

In accordance with an embodiment of the present invention, two close-by probes with the tip of one kept at a fixed distance behind the tip of the other are employed in a fluorescence decay rate temperature sensor. According, the present disclosure provides an improvement over the prior art system and method because the mode of implementation of the present invention obviates the need to move the probe during the temperature measurements.

The present invention provides a method of determining the surface temperature of a sample. The method includes the steps of positioning a fiberoptic temperature sensor having two substantially identical phosphor tips located on a common base and offset by a predetermined distance from the sample surface. As such, a first phosphor tip is positioned at a first distance from a sample surface, and the second phosphor tip is positioned at a second distance from the sample surface during each of the temperature measurements. The method of the invention includes heating the phosphor tips to a plurality of temperature levels by subjecting the phosphor tips to the same plurality of predetermined laser power levels with the tips positioned at the predetermined distances from the sample surface, substantially simultaneously measuring the temperature of the phosphor tips at each of the plurality of laser power levels with the tips positioned at the predetermined distances from the sample surface, and calculating the difference between the detected temperatures at each of the sensor tips for each of the plurality of laser power levels and determining the surface temperature of the sample to be the temperature when the difference between the detected temperature at the two tips is substantially equal to zero.

In a specific non-contact embodiment of the method in accordance with the present invention, the first tip is about 10-100 µm from the surface and the fixed distance between the tips is equal to about 100 µm, so that the second tip is about 100-200 µm from the surface. Alternatively, when employed in a contact mode, the predetermined distance is substantially equal to zero, such that the first of the sensor tips is in contact with the sample surface.

In accordance with the present invention, heating of the sensor tips to a plurality of temperature levels is accomplished by subjecting the phosphor tips to the plurality of predetermined laser power levels, wherein the predetermined laser power levels are selected such that the sensor tips are heated as a result of optical power dissipation in the phosphor tip. Accordingly, self-heating of the tips is accomplished through the application of the heating laser to the phosphor tips.

Measuring the temperature of the sensor tips at each of the plurality of laser power levels further includes, exciting each of the fiberoptic temperature sensor phosphor tips with a modulated laser to cause the phosphor to emit a fluorescence, monitoring the emitted fluorescence to detect a phase shift or the decay time in the fluorescence, correlating the phase shift or the decay time in the fluorescence of the phosphor to the temperature at the fiberoptic temperature sensor phosphor tips.

In accordance with a particular embodiment, identifying the temperature of the sample surface includes, plotting the calculated difference between the sensor tip temperatures against the temperature of the sensor tip at the first predetermined distance for each of the plurality of laser power levels, constructing a substantially smooth line connecting the differences plotted and identifying the temperature of the sample surface as the temperature of the sensor tips at the predetermined distance where the line connecting the differences plotted crosses from positive to negative.

In an additional embodiment for use in monitoring a time varying temperature of a sample, the plurality of laser power levels for heating the phosphor tips may be selected to follow a predetermined profile for the sample surface temperature.

A system for measuring a sample surface temperature in accordance with the present invention includes a fluorescence decay rate temperature sensor comprising two optical patch cables in communication with two probes, each of the two probes further comprising a phosphor tip. The two phosphor tips are positioned in close proximity to each other, the first phosphor tip at a first distance from the surface and the second phosphor tip offset from the first phosphor tip to be at a second distance from the surface. The system includes an excitation laser and a heating laser positioned to provide a plurality of predetermined heating laser power levels to the phosphor tips through the optical fibers to cause the phosphor tips to heat to a plurality of temperature levels. Two detectors are positioned to be in communication through the optical fiber patch cables with each of the probes to monitor the fluorescence emitted by the phosphor tips. A controller processor is provided to detect a phase shift or the decay time in the fluorescence and to correlate the phase shift or the decay time in the fluorescence of the phosphor to the temperature level at the fiberoptic temperature sensor phosphor tip. The controller processor may then be used to analyze the plurality of temperature levels detected at the phosphor tips to identify the interpolated temperature of a sample surface.

In a specific embodiment of the system in accordance with the present invention, either manual or mechanical means may be used for positioning the phosphor tips at the predetermined distances from the sample surface. Either electronic or manual means are used for calculating the difference between the detected temperatures of the phosphor tips at the predetermined distances for each of the plurality of laser power levels employed and either electronic or manual means are used for determining the surface temperature of the sample as being equal to the temperature of the phosphor tips when the difference between the detected temperatures is substantially equal to zero.

While all FDR temperature sensors are within the scope of the present invention, in a particular embodiment, the fluorescent decay rate temperature sensor is an all-crystalline fluorescent decay rate temperature sensor in which the phosphor tip is grown directly onto a crystalline lead fiber. In a specific embodiment, the optical fibers are a single crystal $Y_3Al_5O_{12}$ (YAG) and the phosphor tips $Yb_3Al_5O_{12}$ (YbAG) are grown onto the optical fibers In a specific embodiment, the heating laser and the excitation laser are separate lasers and the heating laser is positioned to have orthogonal polarization relative to the excitation laser. Yet, in an additional embodiment, the heating laser and the excitation laser are the same laser which has a small modulated output superposed on top of a large baseline.

In the case of a time varying temperature monitoring system, the system in accordance with the present invention further includes a profile program module to program the heating laser to follow a predetermined temperature profile when heating the phosphor tips to a plurality of temperature levels.

The system in accordance with the present invention may additionally include a feedback mechanism to allow adjustment of the heating laser based on temperature feedback received from the phosphor tips temperature measurement.

The use of fluorescence decay rate temperature sensors is known in the art. The difficulty of surface temperature sensing utilizing fluorescence decay rate temperature probes stems from two primary sources. First, the actual area of contact is generally a small fraction of the apparent contact area because of surface roughness, creating in effect a thin layer of high thermal resistance between the sample and the temperature probe which in turn causes a temperature differential between the sample and the probe. Additionally, the presence of the probe itself may cause a sufficiently large thermal perturbation sufficient to alter the temperature of the sample at the point of contact. The thermally compensated fluorescence decay rate temperature sensor system and method in accordance with the present invention overcomes these known difficulties.

The tandem thermometer is particularly well suited for making time-varying measurements. With a single probe the thermal compensation principle requires it to be moved, which takes time. With the dual-probe approach this need is eliminated. This advantage over the prior art makes the thermally compensated tandem differential thermometer in accordance with the present invention the preferred choice for monitoring in, for example, rapid thermal processing (RTP) systems.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

In accordance with the present invention is provided a thermally compensated fluorescence decay rate temperature sensor that is capable of measuring the true temperature of a sample surface. In a particular embodiment, the dual-probe FDR sensor is heated utilizing a laser source that causes the phosphor tip to heat up owing to the nonradiative processes experienced by the fluorescent state. The temperature of the phosphor tip of the probes is dependent upon the optical power dissipated at the tip. After the phosphor tips are heated to a predetermined temperature, the phosphors are excited via the optical fiber by a low power source inside the instrument, and the resulting luminescence travels back to a detector. The source and detector, along with signal-processing electronics and control functions are positioned at the near end of the probes and in communication with additional circuitry as required through a fiber-optic connector.

In accordance with an embodiment of the present invention, the output from a laser used to heat the phosphor tips is combined with the output from the pulsed excitation laser of the FDR sensor to establish a dual-probe thermally compensated fluorescence decay rate temperature sensor. FDR temperature sensors lend themselves particularly well to this purpose, since the phosphor, which serves as the active sensing element can readily be heated by either the same excitation laser or a separate laser.

Figure 1:
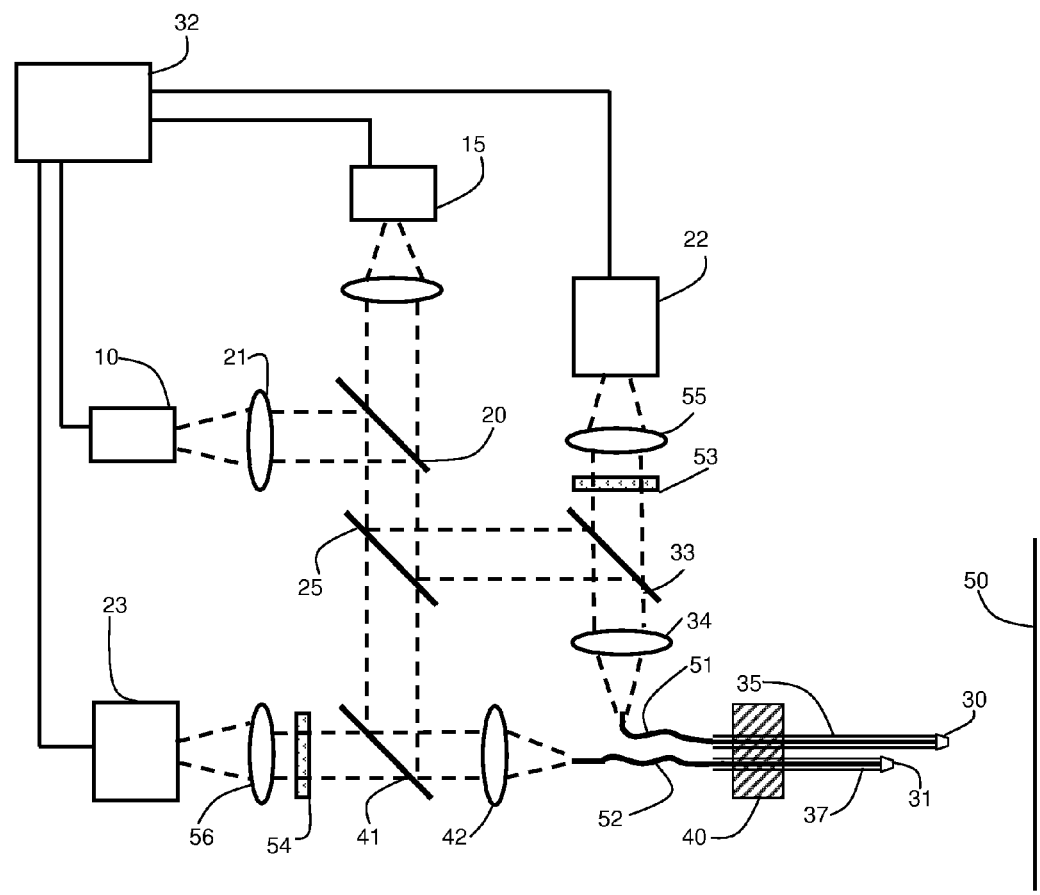
FIG. 1 is a diagrammatic view of an embodiment of the system in accordance with the present invention.

With reference to FIG. 1, in a particular embodiment the thermally compensated fluorescence decay rate temperature sensor in accordance with the present invention includes an LED or excitation laser 15 operating at wavelength $\lambda_1$, and a heating laser 10 operating at $\lambda_2$. It is noted that $\lambda_1$ and $\lambda_2$ may be the same wavelength. The output from the excitation laser 15 passes through a lens 24 and the output from the heating laser 10 passes through a lens 21. The signals are then combined utilizing a beam combiner 20. The combined signals are then passed to a 50/50 beam splitter 25. The 50/50 beam splitter 25 outputs a first signal and a second signal. The first signal is reflected off of a first reflector 33, through a lens 34 and into a fiber optic patch cable 51 which is in communication with a first probe 35. The second signal is reflected off of a second reflector 41, through a lens 42 and into a fiber optic patch cable 52 which is in communication with a second probe 37. The reflectors 33, 41 reflect at $\lambda_1$ and $\lambda_2$, and transmit at the measuring wavelength of the fluorescence signals monitored by detectors 22, 23 which is $\lambda_3$. During a temperature reading, the signals from the probes 35, 37 are then transmitted back through the respective fiber optic patch cables 51, 52 and then through a respective filter 53, 54 which transmits $\lambda_3$ and blocks $\lambda_1$ and $\lambda_2$. The filtered signals are then passed through a respective lens 55, 56 and focused onto respective detector 22, 23. The A controller processor 32 is used to control the lasers and to analyze the signals received from the detectors 22, 23. In accordance with this embodiment of the invention, a first rigid probe 35 and a second rigid probe 37 are mounted on a common base 40 as shown. With this embodiment fluorescence from the phosphor tips 30, 31 of each of the fluorescence decay rate temperature sensors are centered at $\lambda_3$.

In this specific embodiment of the invention, the first tip 30 is positioned either in contact with the sample surface 50 or in close proximity to it (i.e. at a distance of about 10-100 μm). For substantially identical phosphor tips and the same heating laser power dissipated in them, first tip 30 will have a temperature closer to the sample's temperature $T_S$ than second tip 31 by virtue of the fact that the latter is further away from the sample surface. The difference in the measured temperatures of the two tips $\Delta T$ is calculated by the controller processor 32, and together with the measured temperature of the first tip $T_1$, they constitute one data point. A plurality of such data points are generated by launching a plurality of heating laser powers into the two probes. In one embodiment of the present invention, a polynomial fit of $T_1$ vs. $\Delta T$ is performed on the data points by the controller processor 32. Then $\Delta T$ is set equal to zero in the polynomial and the resulting $T_1$ is taken to be the sample's temperature.

While all FDR temperature sensors are within the scope of the invention a particular embodiment utilizes an all-crystalline construction due to its high temperature capability. In a preferred embodiment, the phosphor is grown directly onto a lead crystalline fiber.

In a specific embodiment, it may be desirable to have two different phosphors. However, in all cases, for each pair of measurements, the two probes should be heated to the same extent, such that the rate of thermal deposition in the two phosphor tips is substantially the same. Additionally, the two probes should have substantially the same heat transfer properties.

Figure 2:
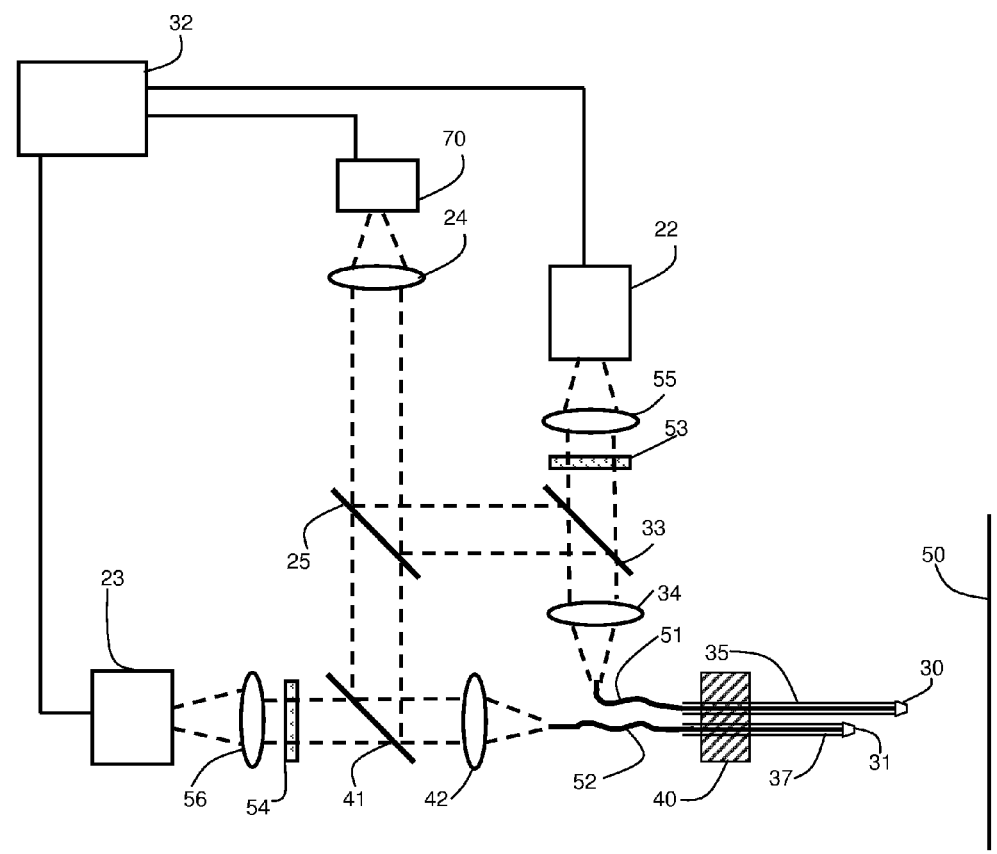
FIG. 2 is a diagrammatic view of an additional embodiment of the system in accordance with the present invention utilizing a single source for both excitation and heating.

FIG. 2 illustrates an additional embodiment of the present invention in which the excitation laser and the heating laser are the same laser 70; therefore an additional laser specific for heating of the phosphors is not required. In this embodiment, the laser 70 may be a partially modulated laser which combines a continuous wave for the heating source and a modulated wave to provide the excitation source. In this embodiment, the beam combiner is not necessary to combine the signals from the two laser sources. The other components are as identified with respect to 1.

Figure 3:
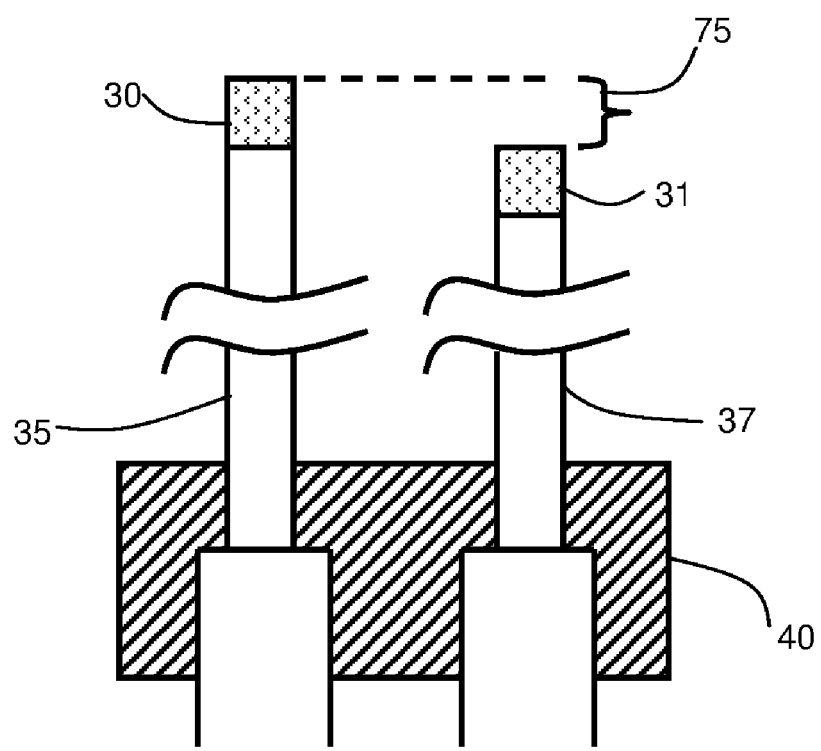
FIG. 3 is a diagrammatic view of a dual-probe temperature sensor in accordance with an embodiment of the present invention.

With reference to FIG. 3, a dual-probe thermally compensated tandem differential thermometer in accordance with an embodiment of the present invention is illustrated wherein the two rigid probes 35, 37 are mounted on a common base 40. As illustrated, the phosphor tip of one probe 35 is offset from the phosphor tip of the other probe 37 by a predetermined separation distance 75.

Figure 4:
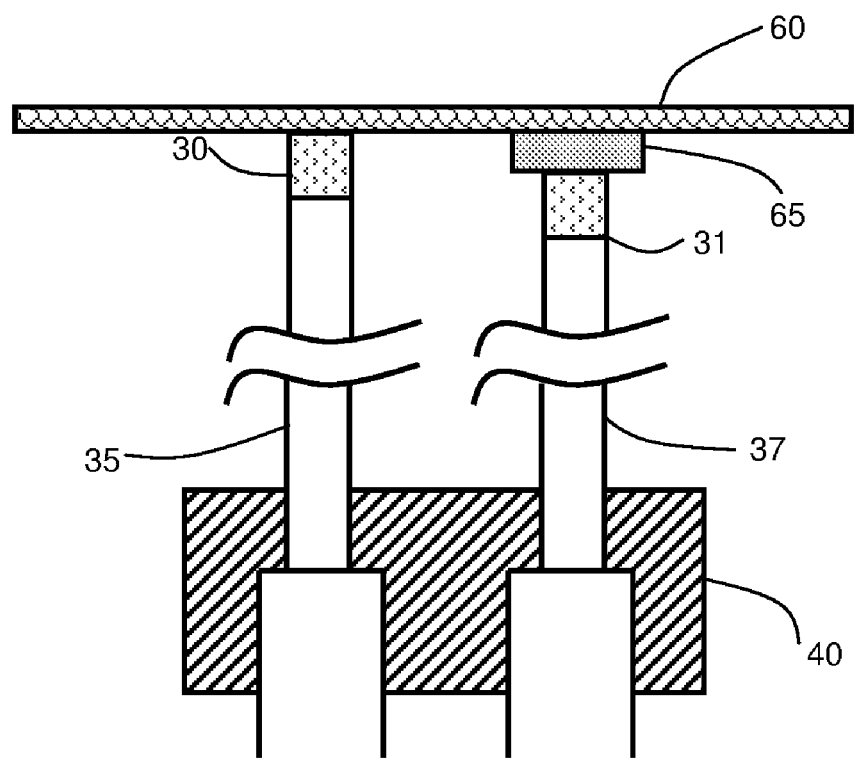
FIG. 4 is a diagrammatic view of a dual-probe temperature sensor in accordance with an embodiment of the present invention incorporating a spacer.

With reference to FIG. 4, an alternative embodiment of the present invention is illustrated in one of the probes 35 is attached to a contact plate 60 and the second probe 37 is attached to the same plate 60 via a spacer 65. The purpose of the contact plate 60 is to both increase the area for thermal exchange with the same face being probed and hold the two probes 35, 37 in a fixed position relative to each other. The spacer 65 acts as a buffer between the contact plate 60 and the second probe 37. The thickness and thermal conductivity of the contact plate 60 can be selected to optimize the performance of the tandem thermometer.

In some situations, it is the temporal evolution of a sample's temperature that needs to be determined. An example in the manufacturing context is the rapid thermal processing of electronic materials. There is a need for improved temperature sensing in rapid thermal processing. Contact thermometers are not well suited for rapid thermal processing. Since the wafers are typically very thin, a contact sensor would produce localized cooling by draining heat from the surface. An additional concern with contact sensors is the possibility of contamination of the wafer and/or the RTP chamber by the contact probe. The dual-probe thermally compensated FDR sensor in accordance with the present invention overcomes these problems. When the thermally compensated FDR sensor in accordance with the present invention is operated in the non-contact mode and the probe is fabricated of a monolithic crystalline structure to insure that it is as clean as the wafer itself, these deficiencies in the prior art are overcome. Additionally, contamination of the wafer through contact can be avoided by providing a silicon overcoat on top of the phosphor tips.

In an additional embodiment of the present invention, the thermally compensated FDR sensor is used to monitor the time varying temperature such as in a rapid thermal processing environment. In this RTP environment, one wants to ensure that the temporal evolution of the sample's temperature follow a prescribed profile. For such application, the heating laser is programmed to produce the same time varying temperature profile in both tips with the probes positioned as in actual deployment from a test sample which is heated in the same way as the actual sample. Once this calibration has been performed, any deviation from the profile, which will be registered differently by the two probes, will signify an error in the process.

It will be seen that the advantages set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A method for determining the surface temperature of a sample, the method comprising:
    positioning a fiberoptic temperature sensor in proximity to a sample, the fiberoptic temperature sensor comprising a first probe having a first phosphor tip offset from a second probe having a second phosphor tip by a fixed separation distance, such that the first phosphor tip is at a first distance from the sample and the second phosphor is at a second distance from the sample which is equal to the first distance plus the fixed separation distance;
    heating each of the probe tips to the same plurality of temperature levels by subjecting the phosphor tips to a plurality of predetermined laser power levels with the probe tips positioned in proximity to the sample surface;
    measuring the temperature of each of the phosphor tips substantially simultaneously at each of the plurality of laser power levels with the tips positioned in proximity to the sample surface;
    calculating the difference between the measured temperatures of the first phosphor tip and the measured temperatures of the second phosphor tip for each of the plurality of laser power levels; and
    determining the surface temperature of the sample to be the temperature of the phosphor tip when the difference between the measured temperature of the first phosphor tip and the measured temperature of the second phosphor tip is substantially equal to zero.

2. The method of claim 1, wherein the first distance is less than about 100 μm.

3. The method of claim 1, wherein the fixed separation distance between the first phosphor tip and the second phosphor tip is about 100 μm.

4. The method of claim 1, wherein the first distance is substantially equal to zero, such that the first phosphor tip is in contact with the sample surface.

5. The method of claim 1, further comprising:
    plotting the calculated difference between the measured temperatures of the first phosphor tip and the measured temperatures of the second phosphor tip for each of the plurality of laser power levels;
    constructing a substantially smooth line connecting the differences plotted; and
    identifying the temperature of the sample surface as the temperature of the sensor tip at the first distance where the line connecting the differences plotted crosses from positive to negative.

6. The method of claim 1, wherein the plurality of laser power levels for heating each of the phosphor tips are selected to follow a predetermined temporal profile for the sample surface temperature.

7. The method of claim 1, wherein measuring the temperature of each of the phosphor tips at each of the plurality of laser power levels further comprises the steps of:
    exciting each of the fiberoptic temperature sensor phosphor tips with a modulated laser or LED to cause each of the phosphor tips to emit a fluorescence;
    monitoring the emitted fluorescence to detect a decay time or phase shift in the fluorescence; and
    correlating the decay time or phase shift in the fluorescence of the phosphor tips to the temperature at each of the fiberoptic temperature sensor phosphor tips.

8. The method of claim 1, wherein the first phosphor tip is heated utilizing a first heating laser and the second phosphor tip is heated utilizing a second heating laser.

9. The method of claim 8, wherein the first heating laser and the second heating laser are the same heating laser.

10. The method of claim 1, wherein the heating laser and the excitation source are derived from the same laser.

* * * * *